United States Patent [19]

Higgins

[11] Patent Number: 4,720,136
[45] Date of Patent: Jan. 19, 1988

[54] CURTAIN-HANGING MEANS FOR RECREATIONAL VEHICLES

[75] Inventor: Bob J. Higgins, Elkhart, Ind.
[73] Assignee: Trans-Aire International, Inc., Elkhart, Ind.
[21] Appl. No.: 889,111
[22] Filed: Jul. 22, 1986
[51] Int. Cl.[4] .............................................. B60J 1/16
[52] U.S. Cl. .................................. 296/138; 296/143; 16/94 D; 16/95 D; 16/96 D
[58] Field of Search ............... 296/156, 138, 139, 143, 296/97 G, 83, 84 M; 16/94 D, 95 D, 96 D; 160/102, 84 R, DIG. 2, 349 R, 349 D

[56] References Cited

U.S. PATENT DOCUMENTS

| | | | |
|---|---|---|---|
| 3,695,329 | 10/1972 | Roller | 160/84 R |
| 3,881,218 | 5/1975 | Palmer | 16/94 D |
| 4,505,509 | 3/1985 | Simeri et al. | 296/156 |

FOREIGN PATENT DOCUMENTS

| | | | |
|---|---|---|---|
| 717089 | 1/1942 | Fed. Rep. of Germany | 16/95 D |
| 337361 | 10/1930 | United Kingdom | 16/94 D |

*Primary Examiner*—Robert B. Reeves
*Assistant Examiner*—Carol L. Olson
*Attorney, Agent, or Firm*—Gordon W. Hueschen

[57] ABSTRACT

There is disclosed a curtain-hanging track adapted to be mounted in a recreational vehicle having a flat, elongate rail fastened to an interior side wall thereof along and adjacent to the bottom of a window and a support member for said track which is fastened to the outer side end of the rail and disposed between it and the inner side wall.

7 Claims, 4 Drawing Figures

CURTAIN-HANGING MEANS FOR RECREATIONAL VEHICLES

BACKGROUND OF THE INVENTION

1. Field of the Invention and Prior Art

The invention relates to improvements in curtain-hanging means for recreational vehicles.

It has become common practice to effect conversion of vans into recreational vehicles. For this purpose, curtain-hanging means that are simple and easy to install and which are cosmetically acceptable are required. The curtain hanging means for this purpose heretofore available, however, have not been entirely satisfactory. It is an object of the invention, therefore, to provide new and effective curtain-hanging means which are eminently more suitable for use in recreational vehicles than any heretofore available.

2. Summary of the Invention

The invention relates to an improvement in recreational vehicles having a flat, elongate rail fastened to an interior side wall thereof and along and adjacent to the bottom of a window of the recreational vehicle and curtain-hanging means for hanging curtains in front of the window;

which comprises:

a track member having curtain-holding glides slideable therein and extending along said rail adjacent the bottom of the window; and a support member for said track having a vertical portion which extends upwardly from said rail to said track member, a horizontal portion which rests on said rail member, and a second vertical portion which extends downwardly between said rail and the wall of said recreational vehicle to which said rail member is fastened;

said second vertical portion of said support member being fastened to said rail member whereby the fastening means therefor is concealed.

The invention also comprises one or more further features wherein the interior wall to which said rail member is affixed has a resilient inner surface adapted to accommodate said second vertical portion of said support member; wherein said track member comprises a channel-shaped extrusion having inturned edges and said glides comprise a T-shaped foot complementary with the interior shape of said channel member, a neck adapted to project outwardly of said inturned edges, and a fastening head to which the curtains can be fastened; wherein said track member and said support member are unitary extrusion; and wherein the base of said channel-shaped extrusion is an extension of the upper vertical portion of said support mmember and said horizontal portion of said support member is integral at its outer edge with said second vertical portion of said support member and at its inner edge with the first vertical portion.

The invention also is directed to a curtain-hanging means for a recreational vehicle which comprises an extruded channel-shaped track member having inturned edges and a planar base and an integral support member, said support member having a base portion which is an extension of said planar base and lies substantially in the plane thereof and a free-end portion which is parallel to the plane of said planar base and is connected to the end of said base portion by a shoulder which projects away from the plane of said planar base so that said free-end portion is offset with respect to said base portion away from the plane of said planar base, and also to a further feature wherein the base portion of said support member including the planar base of said channel-shaped track member is roughly equal in length to the length of said free-end portion, and the base and free-end portions of said support member have essentially the same thickness and are offset at said shoulder a distance roughly equal to the thickness thereof.

DETAILED DESCRIPTION OF THE PREFERRED EMBODIMENT

Figure 1:
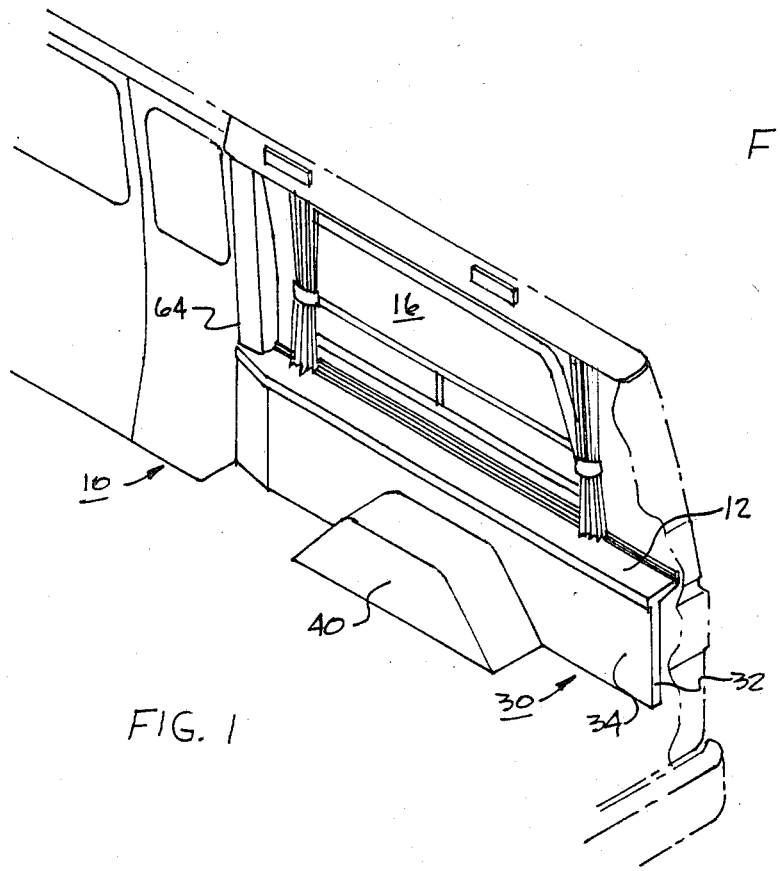

In FIG. 1 there is seen an interior view of a side 10 of a recreational vehicle. There is a flat, elongate, horizontal rail 12 fastened along the side wall 14 under and adjacent a window 16 in side wall 14. The rail 12 is fastened to an elongate fastening strip 18 by means of the angle piece 20 and the strip 18 is fastened to the wall 14 by screws (not shown) or like fastening means.

The wall 14 is composed of an outer panel 22 of sheet metal or the like; an inner panel 24 of plywood or the like and an inner cushion 26; and a filling of insulating material 28.

Figure 2:
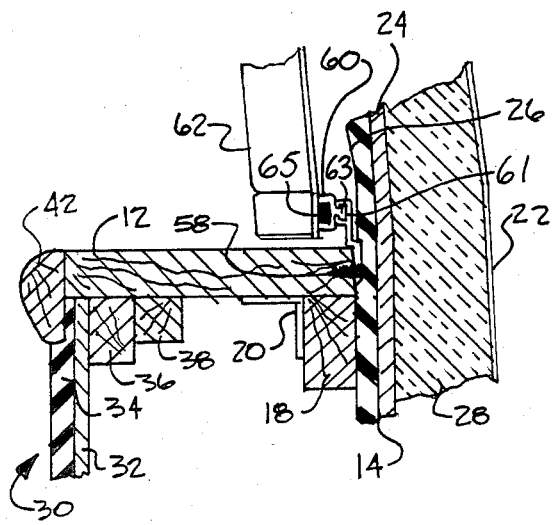
FIG. 2 is detail view of a transverse section of FIG. 1.
Figure 4:
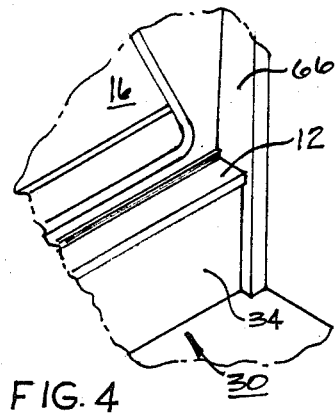
FIGS. 1 and 4 are partial views of an interior wall of a recreational vehicle according to the invention.
Figure 3:
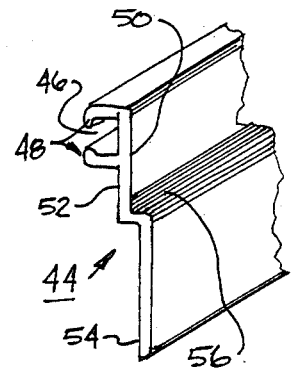
FIG. 3 is a partial end view in isometric projection of a support member of the invention.

The inner edge of the rail 12 is supported by supporting wall 30 composed of an inner panel 32 of plywood or the like and an outer facing 34 of cushioning material. The rail 12 is fastened to the wall 30 by elongate fastening strip 36 which is fastened to wall 30 and rail 12 by adhesive and/or screws (not shown) or the like. A further fastening strip 38 may be fastened to the rail 12 and the fastening strip 36. In the form shown, the supporting wall 30 is fitted over the fender 40. A molding strip 42 is fastened by adhesive, or otherwise fastened, to the rail 12 and the supporting wall 30 as seen in FIG. 2. The facing material 34 abuts the molding strip 42.

A curtain support member 44 comprises a curtain-glide-receiving channel 46 having inturned lips 48 and a planar base 50; a supporting leg having an upper or base portion 52, a lower or free-end portion 54, and a shoulder portion 56. The upper portion extends from the bottom of the planar base 50 of the channel member 46 and lies substantially in the plane of the planar base 50 and terminates at the inner side of the shoulder 56. The bottom portion 54 begins at the outer side of the shoulder 56 and is parallel to the plane of the planar base 50. The upper portion 52 plus the base 50 have a length roughly equal to the length of the lower portion 54 and the shoulder 56 is offset toward the outside a distance roughly equal to the thickness of the portions 52 and 54.

The lower portion 54 is disposed between the rail 12 and the wall 14 and is fastened to the end of rail 12 by screw 58 or otherwise fastened thereto before the rail 12 is fastened to the wall 14. The shoulder 56 rests on the top of rail 12 and thus gives vertical support to the channel 46. When the rail 12 is fastened to the wall 14 the bottom portion 54 is embedded in the cushioning material 26 and the upper portion 52 and the planar base 50 abut the cushioning material.

The channel member 46 thus constitutes an elongate, longitudinal glide-receiving track for receiving curtain glides 60 to which curtain 62 is fastened in the usual manner. Each glide 60 has a T-shaped foot 61, a neck 63, and fastening head 65. The channel member 46 can extend the full length of the rail 12 or just far enough along the same to provide the desired amount of adjustability for the curtains. Advantageously the ends of the channel members 46 extend up to vertical corner members at the ends of the rail 12, such as the member 64 at the front end of rail 12. A like corner member 66 is provided at the rear end of the rail 12.

A longitudinal track (not shown) is located along the top of the window. This top track can be of any suitable design, such as, for example, that shown in my copending application (Higgins 7) filed of even date hereof, the specification of which application is incorporated herein by reference.

It is to be understood that the above-described modification is given by way of illustration only and that the invention is not limited to it or to any particular modification because various modifications and equivalents will be apparent to one skilled in the art and the invention, accordingly, is not to be limited except by the full scope of the appended claims.

I claim:

1. In a recreational vehicle having a flat, elongate rail fastened to an interior side wall thereof and along and adjacent to the bottom of a window of the recreational vehicle and curtain-hanging means for hanging curtains in front of the window;

the improvement which comprises:
 a track member for curtain-holding glides which member extends along said rail adjacent the bottom of the window; and
 a support member having a upper vertical portion which extends upwardly from said rail to said track member, a horizontal portion which rests on said rail member, and a lower vertical portion which extends downwardly between said rail and the wall of said recreational vehicle to which said rail member is fastened;
 said lower vertical portion of said support member being fastened to said rail member whereby the fastening means therefor is concealed.

2. The improvement of claim 1, wherein the interior wall to which said rail member is affixed has a resiliently-deformable surface in which said lower vertical portion of said support member becomes embedded when said rail member is fastened to said interior wall.

3. The improvement of claim 1, wherein said track member comprises a channel-shaped extrusion having a base and inturned edges and said glides comprise a T-shaped foot complementary with the interior shape of said channel member, a neck adapted to project outwardly of said inturned edges, and a fastening head to which the curtains can be fastened.

4. The improvement of claim 1, wherein said track member and said support member are a unitary extrusion.

5. The improvement of claim 3, wherein the base of said channel-shaped extrusion is an extension of the upper vertical portion of said support member and said horizontal portion of said support member is integral at its outer edge with said lower vertical portion of said support member and at its inner edge with said upper vertical portion.

6. An extrusion, adapted for use as a curtain-hanging means for a recreational vehicle having a flat, elongate rail fastened to an interior side wall thereof and along and adjacent to the bottom of a window of the recreational vehicle, said extrusion comprising an extruded channel-shaped track member having inturned edges and a planar base and an integral support member, said support member having a base portion which is an extension of said planar base and lies substantially in the plane thereof, a free-end portion which is parallel to the plane of said planar base and is connected to the end of said base portion by a shoulder which projects away from the plane of said planar base so that said free-end portion is offset with respect to said base portion away from the plane of said planar base, said free end portion of said support member being adapted to be fastened to said rail.

7. The extrusion of claim 6 wherein the base portion of said support member including the planar base of said channel-shaped track member is roughly equal in length to the length of said free-end portion and the base and free-end portions of said support member have essentially the same thickness and are off-set at said shoulder a distance roughly equal to the thickness thereof.

* * * * *

UNITED STATES PATENT AND TRADEMARK OFFICE
CERTIFICATE OF CORRECTION

PATENT NO. : 4,720,136

DATED : January 19, 1988

INVENTOR(S) : Bob J. Higgins

It is certified that error appears in the above-identified patent and that said Letters Patent is hereby corrected as shown below:

Column 1, line 51, after "are" insert -- a --.

Column 4, line 43, "off-set" should read -- offset --.

Signed and Sealed this

Nineteenth Day of July, 1988

Attest:

DONALD J. QUIGG

*Attesting Officer*   *Commissioner of Patents and Trademarks*